US009177324B2

(12) United States Patent
Chourey

(10) Patent No.: US 9,177,324 B2
(45) Date of Patent: Nov. 3, 2015

(54) METHODS AND SYSTEMS FOR ANALYZING INTERNET-BASED COMMUNICATION SESSIONS THROUGH STATE-MACHINE PROGRESSION

(71) Applicant: Upland Software VII, Inc., Austin, TX (US)

(72) Inventor: Deepesh Chourey, Dublin, CA (US)

( * ) Notice: Subject to any disclaimer, the term of this patent is extended or adjusted under 35 U.S.C. 154(b) by 0 days.

(21) Appl. No.: 14/537,538

(22) Filed: Nov. 10, 2014

(65) Prior Publication Data

US 2015/0066591 A1  Mar. 5, 2015

Related U.S. Application Data

(63) Continuation of application No. 13/662,174, filed on Oct. 26, 2012, now abandoned, which is a continuation of application No. 13/297,161, filed on Nov. 15, 2011, now Pat. No. 8,326,964.

(60) Provisional application No. 61/559,610, filed on Nov. 14, 2011.

(51) Int. Cl.
| G06F 13/00 | (2006.01) |
| G06Q 30/02 | (2012.01) |
| H04L 29/08 | (2006.01) |
| G06F 17/30 | (2006.01) |

(52) U.S. Cl.
CPC ...... *G06Q 30/0201* (2013.01); *G06F 17/30867* (2013.01); *H04L 67/22* (2013.01); *H04L 67/306* (2013.01)

(58) Field of Classification Search
CPC .............. H04L 41/0213; H04L 29/08072; H04L 29/06; H04L 41/22; H04L 41/12; H04L 67/22; H04L 67/306; G06F 17/30867; G06Q 30/0201
USPC .......................................................... 709/223
See application file for complete search history.

(56) References Cited

U.S. PATENT DOCUMENTS

| 6,269,275 | B1 * | 7/2001 | Slade .............................. 700/90 |
| 6,564,259 | B1 * | 5/2003 | Baber et al. ................... 709/223 |
| 7,328,177 | B1 * | 2/2008 | Lin-Hendel .................. 705/26.7 |
| 7,379,965 | B2 * | 5/2008 | Sherwood et al. ............. 709/203 |
| 2003/0167195 | A1 * | 9/2003 | Fernandes et al. ................ 705/8 |
| 2004/0225562 | A1 * | 11/2004 | Turner ............................ 705/14 |
| 2005/0022103 | A1 * | 1/2005 | Yundt-Pacheco ............. 715/500 |
| 2009/0018896 | A1 * | 1/2009 | McGreal ......................... 705/10 |
| 2009/0164940 | A1 * | 6/2009 | Wampler ........................ 715/808 |

* cited by examiner

*Primary Examiner* — Robert B Harrell
(74) *Attorney, Agent, or Firm* — Traverse Legal, PLC

(57) ABSTRACT

A method of analyzing Internet-based communication sessions may include detecting interactions during a communication session and detecting an associated characteristic. The method may also include identifying other communication sessions that are also associated with the characteristic and accessing a group profile of the other communications sessions. The group profile may be assigned a first group profile state in a state-machine-based progression of group profile states and have a group lead score. The method may additionally include associating the communication session with the group profile, adjusting the group lead score based on the communication session to cross a threshold value, and moving to a second group profile state. The method may further include authorizing devices associated with the group profile access to additional data after moving to the second group profile state.

20 Claims, 12 Drawing Sheets

METHODS AND SYSTEMS FOR ANALYZING INTERNET-BASED COMMUNICATION SESSIONS THROUGH STATE-MACHINE PROGRESSION

CROSS-REFERENCES TO RELATED APPLICATIONS

This application is a continuation-in-part of U.S. Ser. No. 13/662,174 filed Oct. 26, 2012 titled "LEAD MANAGEMENT IN BUSINESS-TO-BUSINESS SALES, which is a continuation of U.S. Ser. No. 13/297,161 filed Nov. 15, 2011 titled "WEBSITE DATA CONTENT ACCESS PROGRESSION", which is a nonprovisional of, and claims benefit to Provisional Application No. 61/559,610 filed Nov. 14, 2011 titled "LEAD MANAGEMENT IN BUSINESS-TO-BUSINESS SALES." Each of these applications is hereby incorporated by reference in its entirety for all purposes.

This application is also a continuation-in-part of U.S. Ser. No. 13/646,240 filed Oct. 5, 2012 titled "PROGRESSIVE ACCOUNT STATES FOR AGGREGATE WEBSITE VISITORS", which is a continuation-in-part of U.S. Ser. No. 13/614,582 filed Sep. 13, 2012 titled "AUGMENTING PROGRESSIVE PROFILE STATES WITH EXTERNAL DATA SOURCES". Each of these applications is hereby incorporated by reference in its entirety for all purposes.

This application is also related to PCT Application No. PCT/US2011/042039, filed Jun. 27, 2011, entitled "STAGNANT VISITOR MANAGEMENT FOR ENGAGEMENT PROGRESSION ON WEB SITES" which is incorporated herein by reference.

BACKGROUND OF THE INVENTION

This disclosure relates in general to customer engagement tools and, but not by way of limitation, to website engagement tools.

Websites are often a part of an integral plan in advertising business solutions and engaging visitors as customers or potential customers. Nurturing those visitors to the website has traditionally taken human expertise, skill, and effort that has been impractical in converting a large number of visitors into customers. While an experienced sales person may be able to quickly evaluate a contact and determine whether or not he/she is a prospective customer, the sheer volume of visitors to a website and the impersonal nature of web interactions make large-scale human involvement infeasible and impractical. Business-to-business websites traditionally have not reached their marketing potential in yielding qualified leads.

Historically, email marketing and sales campaigns have driven visitors to a website to discover information about a company—much like an online brochure. With the advent of sophisticated marketing automation tools, marketing campaigns have focused on creating conversions or registrations to capture visitor data. However, real personalization of the website visitor's experience has not been possible due to the fact that the marketing tools could not instruct a static website what particular content to present to any given visitor. Hence, improvements in the art are needed.

BRIEF SUMMARY OF THE INVENTION

In one embodiment, the present disclosure describes methods and systems for recording and analyzing a visitor's interactions with a website aimed at turning the visitor into a qualified sales lead. Lead scoring may be used, wherein a lead score is based on interactions with content, navigation through a website, and the providing of information from the visitor. Events, such as lead scores exceeding a threshold value, may prompt a request for information from the visitor. Providing information may increase a profile level and allow access to previously gated website content. Visitor information and/or associated business information may be stored in a user profile. Additionally, interests of the visitor and/or an associated business area may be ascertained. The interests, lead score, and progressive profiles may be used to tailor the content and organization of the website according to the needs of the visitor, to suggest content and business solutions to the visitor, and to determine if/when a visitor is qualified as a lead, and thus ready for contact from a sales team.

Specifically, embodiments for the present invention include method for managing interactions between a visitor associated with a first business, and a website associated with a second business, to generate a qualified business lead. The method comprises associating a lead score with the visitor, and associating a user profile with the visitor, where the user profile includes a profile level that is determined by an amount of information provided by the visitor to the second business via the website. The method also comprises changing the lead score in response to an action taken by the visitor on the website, and requesting first information from the visitor when the lead score exceeds a first profile threshold value. Furthermore, the method comprises elevating the profile level of the user profile when the visitor provides first information, and allowing the visitor to access additional content on the website when the profile level is elevated. Additionally, the method comprises determining that the visitor is a qualified lead when the lead score exceeds a threshold value.

The method further comprises requesting additional information from the visitor in response to receiving first information from the visitor, where the additional information is based on the first information. The method also further comprises creating a business account associated with the first business and associating the user profile with the business account. Additionally, the method may comprise receiving business information based on an IP address associated with the visitor, storing the business information in the user profile, and tailoring a section of content on the website based on the business information. The method may also comprise requesting second information from the visitor when the lead score exceeds a second profile threshold value, where the second profile threshold value is greater than the first profile threshold value, in response to an attempt by the visitor to access website content that is tagged at a profile level that is higher than the profile level of the user profile. In some embodiments, the first information includes a selection by the visitor of an interest, where the interest is associated with a business solution offered by the second business. The method my further comprise determining geo-location information about the visitor based on an IP address, and using the geo-location information to populate the user profile.

In a further embodiment, a method for managing interactions between a visitor associated with a first business, and a website associated with a second business, to generate a qualified business lead is described. The method comprises associating a lead score with the visitor, and associating a user profile with the visitor, where the user profile includes a profile level that is determined by the amount of information provided by the visitor to the website. the method further comprises defining a plurality of interests related to the second business, associating each interest with one or more categories of website content, and associating an interest from the plurality of interests with the user profile, where the association is based on activity of the visitor on the website. Additionally, the method comprises tailoring the content and organization of the website based on the interest associated with the visitor. The method also comprises changing the lead score in response to an action taken by the visitor on the website, requesting first information from the visitor when the lead score exceeds a first profile threshold value, and elevating the profile level of the user profile when the visitor provides first information. Additionally, the method comprises determining that the visitor is a qualified lead when the lead score exceeds a threshold value.

The method may further comprise displaying a banner advertisement on the website, creating a business account associated with the first business and associating the user profile with the business account, and/or assigning one or more of the plurality of interests to the business account based on the interests assigned to the visitor. The method may also comprise assigning one or more of the interests to the business account based on business information received from a third party, where the business information was acquired using an IP address of the visitor. Additionally, the method may comprise storing website content for the visitor in a resource portfolio, displaying additional content in the resource portfolio based on the interest assigned to the visitor, and/or increasing the lead score based on the first information provided by the visitor. Furthermore, the plurality of interests may correspond to a plurality of personas that are targeted by the second business. Also, hyperlinks to content may be made available to the visitor on the website based on the interest associated with the visitor.

In yet another embodiment, a computer-readable medium for managing interactions between a visitor associated with a first business, and a website associated with a second business, to generate a qualified business lead, having sets of instructions stored thereon is described. When executed by a computer, the instruction may cause the computer to associate a lead score with the visitor, and associate a user profile with the visitor, where the user profile includes a profile level that is determined by an amount of information provided by the visitor to the website. The instructions may further cause the computer to define a plurality of interests related to the second business, associate each interest with one or more categories of website content, and associate an interest from the plurality of interests with the user profile, where the association is based on activity of the visitor on the website. Additionally, the instructions may cause the computer to tailor the content and organization of the website based on the interest associated with the visitor, change the lead score in response to an action taken by the visitor on the website, request first information from the visitor when the lead score exceeds a first profile threshold value, and elevate the profile level of the user profile when the visitor provides first information. Also, the instructions may cause the computer to determine that the visitor is a qualified lead when the lead score exceeds a threshold value.

The computer-readable medium further include instructions that may cause the processor to create a business account associated with the first business and associate the user profile with the business account, assign one or more of the plurality of interests to the business account based on the interest associated with the visitor, display statistical information related to a number of visitors who have visited the website and a percentage of the number of visitors who have been qualified as a lead, and/or provide an interface allowing a user associated with the second business to adjust lead scores associated with both individual content instances and content categories of the website.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 7A illustrates an embodiment of an interface for selecting information fields for a profile level.

FIG. 7B illustrates an embodiment of an interface in the WCMS for selecting the trigger events for each profile level.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing an exemplary embodiment. It is understood that various changes may be made in the function and arrangement of elements without departing from the spirit and scope as set forth in the claims.

Web Content Management System

As used herein, the term "website" refers to a single web domain. The website may be comprised of multiple individual pages; however, each page in the website will be associated with a single business brand or organization. For example, www.clickability.com would be considered a website associated with the Clickability™ brand and product. Each webpage in the www.clickability.com domain would be considered a part of the www.clickability.com website, as used herein.

Figure 1:
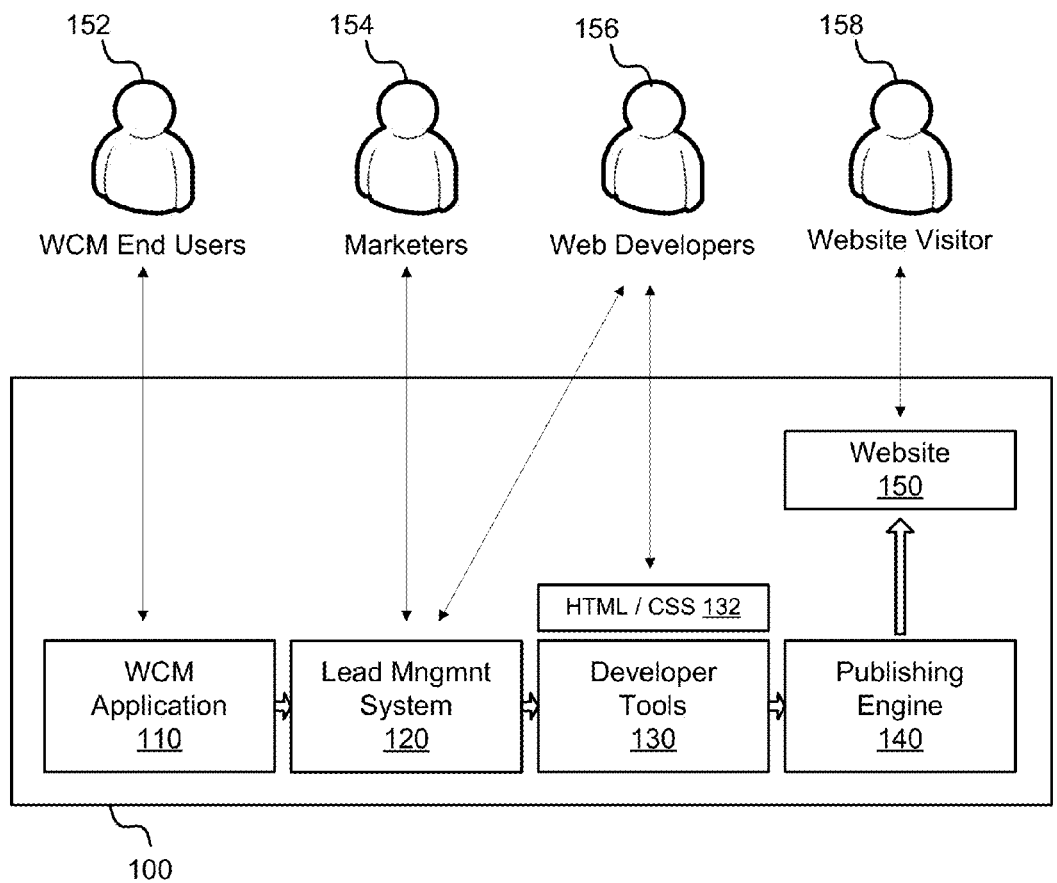
FIG. 1 illustrates a block diagram of an embodiment of a Web Content Management System.

Turning first to FIG. 1, a Lead Management System 120 may be an integrated part of a Web Content Management System (WCMS) 100. A WCMS 100 is a software system that provides website authoring, collaboration, and administration tools designed to allow users with varying degrees of knowledge of web programming languages or markup languages to create and manage website content. The WCMS 100 allows tasks related to creating and maintaining a website to be divided between the various parties that are best suited to completing those tasks. It also allows marketers to control aspects of how content is presented and how the website is organized. An example of a WCMS 100 is available from Clickability™.

The Web Content Management (WCM) application 110 is the application used to create and manage all content media, functionality, page designs, and page layouts that are used to build and maintain a website 150. The WCM application end users 152 may be primarily editors, authors, designers, and developers. The developer tools 130 may be comprised of the various development languages, tools and environments needed to create the design, structure, logic, and presentation of the website 150. In one embodiment, a template language designed by Clickability™ may be used in conjunction with the Apache™ Velocity Engine to implement the developer tools 130. Web developers 156 typically use the developer tools 130 and the functionality defined by the Lead Management System 120 in the WCMS 100. The publishing engine 140 may dynamically combine the content managed in the WCM application 110 with the templates and HTML/CSS designs from the developer tools 130 to create and render the pages of the website 150. Visitors 158 to the website 150 may interact with the website 150, and the visitor's experience may be monitored and customized by the lead management system 120.

Figure 2:
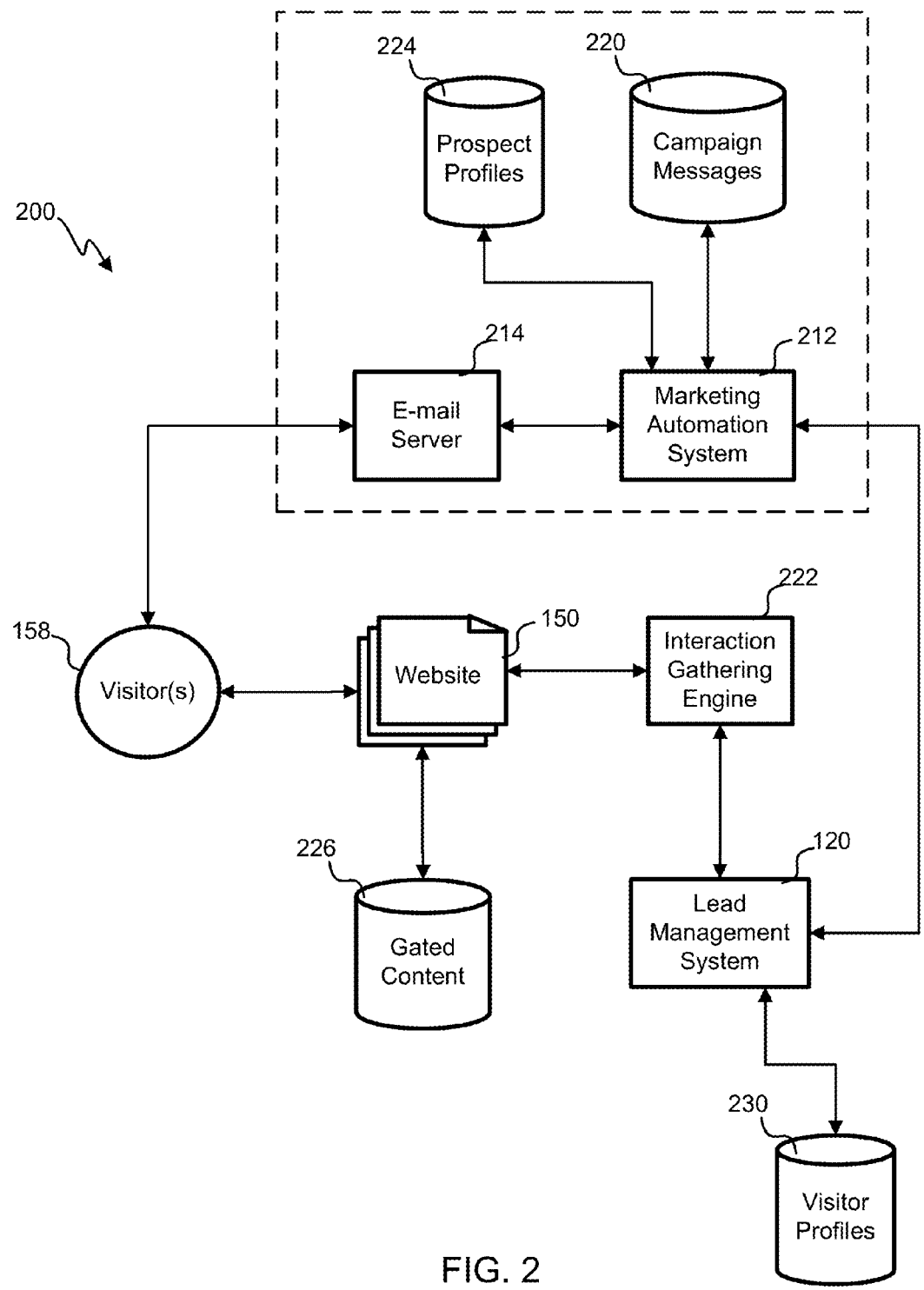
FIG. 2 illustrates a block diagram of an embodiment of a Lead Management System.

Turning next to FIG. 2, a block diagram 200 of an embodiment of a lead management system 120 and some of the possible surrounding systems are shown. Visitors 158 interact with a website 150 monitored by the lead management system 120. A marketing automation system 212 may drive prospects to the website 150. Although a marketing automation system 212 is shown separately, the marketing automation system 212 could be integrated with the lead management system 120 in other embodiments. The lead management system 120 choreographs the website's interactions with the visitor 158 to lead to a sale or deepen the relationship with the visitor 158.

The marketing automation system 212 in this embodiment may perform e-mail campaigns on prospective customers to engage such individuals at the website 150. Campaign messages 220 are distributed through the e-mail server 214 to prospective customers that may click-through the e-mail message to a landing pad on the website 150. The campaign messages 220 can be customized for a particular prospect. Where a prospect becomes a visitor 158 at the website 150, the prospect profiles 224 can optionally be provided to the interaction gathering engine 222 in some embodiments.

The website 150 may include the interaction gathering engine 220 that monitors the behavior a visitor 158 on the website 150 and records information about the visitor 158. The interaction gathering engine 222 could be hosted on the same computer system, hosting service or content delivery network (CDN) as the website 150. Some information may be provided by external sources, such as the marketing automation system 212. The website 150 provides some information to all visitors 158, but other gated content 226 may be provided to visitors 158 who have reached a particular qualified level.

Information for the visitors 158 and their behavior on the website 150 are monitored by the interaction gathering engine 222. The lead management system 120 takes the information and stores it in user profiles 230. Interaction between the lead management system 120 and the marketing automation system 212 allows sharing of profiles 224, 230. Additionally, the lead management system 120 can trigger the marketing automation system 212 to perform an e-mail campaign.

It will be understood that arrangement of the WCMS 100 and the lead management system as depicted in FIG. 1 and FIG. 2 is merely illustrative. Many other arrangements of software and hardware functionality are possible. For example, software modules that are depicted as separate in these figures may be combined into the same software module. Likewise, software modules may be divided an implemented remotely from one another in different hardware systems. Additionally, the various roles assigned to web developers, marketers, users, and content designers may be reassigned according the individual needs and expertise of an implementing business.

Tracking Visitors with User Profiles

In order to assess the interactions of a visitor 158 with the website 150, ascertain interests, and create a qualified lead, the website 150 may need to identify individual visitors 158, then track and store information such that the visitor's overall quality as a lead can be assessed. When a visitor 158 first accesses the website 150, the visitor 158 may be classified as an anonymous visitor. The interactions with the website 150 by an anonymous visitor 158 may be a singular visit, or they may be comprised of multiple visits, where each visit may have one or multiple page requests within the website 150. The end of a visit may be governed by a period of inactivity, and a visit may be deemed complete after the period of inactivity surpasses an established visit-timeout value. For example, a period of inactivity of 30 minutes may signal the end of a visit. In some embodiments, if a visitor 158 closes their browser and returns within the timeout period, the visitor 158 may be credited with a new visit rather than a continuation of the previous visit. Some embodiments may also use an aging cutoff to detect stale visitors 158. For example, if the time between visits to the website 150 exceeds the aging cutoff, such as 120 days, and the visitor 158 has not submitted information for a user profile, then the website 150 may start a new user profile for the visitor 158. Alternatively, if the visitor 158 has established a user profile, then an expired account may reset certain information in the user profile that is likely to be stale at that point.

To track a visitor 158, the lead management system 120 in the WCMS 100 may have logic added to at least some of the published pages within the website 150 specifically for this purpose. For example, the website 150 could check for a vmSessionId cookie, which may include a string token that may uniquely identify a visitor 158. If such a cookie exists, the website 150 may load any information that has been saved by the website 150 for that particular visitor 158. If the vmSessionId cookie does not exist, the website 150 may create a new anonymous visitor 158 profile and create a vmSessionId cookie in the browser of the visitor 158. Additionally, if the visitor does not have a vmSessionId cookie, the website 150 may present the visitor 158 with the opportunity to provide identifying information, such as a user name and/or password to identify the visitor 158. In this case, the website 150 may recreate a vmSessionId cookie and load information about the visitor 158 from a stored user profile. This may allow the website 150 to recognize the visitor 158 on a subsequent visit without the visitor 158 being required to provide any identifying information.

After an anonymous user profile is established for the visitor 158, any information provided by the visitor 158 and any information that may be ascertained by analyzing the interactions of the visitor 158 with the website 150 may be stored in the user profile. As more information is collected from a visitor 158, the anonymous user profile may be populated such that the visitor 158 is no longer considered anonymous, but instead becomes an engaged prospective sales lead. All aspects of the website interaction may be stored in the user profile, such as the interests, contact information, and/or business needs of the visitor 158. The various uses and function of the user profile are discussed in greater detail later in this disclosure.

While much of the information stored in a user profile may be provided by the visitor 158 or ascertained by analyzing the visitor's website interactions, it is also possible to import information about a visitor 158 based on the an IP address. In one embodiment, the website 150 may be able to detect the IP address of the visitor 158, and then an existing database may be queried using the IP address to gather additional information about the visitor 158. For example, Demandbase® is a third party service that can provide information about a business based on an IP address. Another such product is Geo Location from MaxMind®, which provides geographic location information based on the IP address of the visitor 158. The information acquired from an IP mapping service may be imported into the user profile of the visitor 158. In the case where visitor 158 is new or anonymous and the user profile is empty, the information from the IP mapping may be used to initially populate a user profile with information. Using services such as these also relieves the visitor 158 of the need to provide this information themselves, which may in turn ease the process of creating a qualified sales lead.

In addition to individual user profile, accounts may also be established for businesses. A business account may be established explicitly by the business by registering as such with the website 150. Alternatively, if a visitor 158 provides information identifying the business of the visitor 158, a separate business account may be created. In some embodiments, IP mapping as described above may be used to identify a business and to identify individual visitors associated with that business. For example, a new visitor 158 may access the website 150, and the website 150 may recognize the IP address of the visitor 158 as belonging to, for example, Limelight Networks. In this case, a business account for Limelight Networks may be created and populated with information about the business through methods similar to those described above. Additionally, a user profile could be created for the visitor 158, and the user profile could be linked to the business account, and/or information from the business account could be imported and stored in the user profile. Business accounts may be very important for a website 150 to ascertain, particularly in the context of business-to-business solutions for which the embodiments described herein are concerned.

Lead Scoring

Lead scoring is a method for a marketer to quantitatively assess a sales prospect's interest in the marketer's products. The marketer may define parameters for creating, incrementing, and decrementing lead scores based on various factors. Explicit factors may be used, such as demographic information, expressions of the interests of a visitor 158 in the marketer's products, company size, industry segment, job title, and/or geographic location. Implicit factors may be derived by monitoring a sales prospect's behavior. Examples of implicit factors may include website visits, e-mail openings, clicks on advertisements, and/or accessing information. Any of these explicit or implicit factors may be tracked by the marketer and may contribute, either positively or negatively, to a lead score. Generally, a higher lead score may indicate that the prospect is likely to respond favorably to further interaction with the marketer's attempts to solicit a sale, and that eventually the prospective customer should be routed from marketing to the sales department.

In the context of a website 150 operated by a WCMS 100, the concept of lead scoring may be tailored to track the actions of a visitor 158 to the website 150. Explicit factors contributing to lead score of the visitor 158 may include filling out online forms, requesting information, participating in chats, and/or registering a user profile with the website 150. Implicit scores may be derived from monitoring various forms of the online behavior of the visitor 158, such as number, frequency, and recency of website visits, whitepaper downloads, website navigation, access of specific content, and/or searching for products or solutions. Each of these factors may have a numerical score associated with the factor, and that score may be added to, or subtracted from, the overall lead score of the visitor 158. Scoring may be dynamic, such that the score associated with a current action may be increased or decreased based on previous actions. For example, each visit to a webpage that is related to the same topic may increase the score associated with each successive viewing of each new webpage. On the other hand, multiple views of the same webpage may decrease the score associated with each successive viewing of the same webpage.

As the lead score for a particular visitor 158 increases during their association with the website 150, the WCMS 100 may take actions to increase the website's interactivity with the visitor 158. Generally, certain threshold values may be established to act as triggers. As the lead score of the visitor 158 crosses a threshold value, the website 150 may present the visitor 158 with more interactive content that may be calculated to increase the assumed interests of the visitor 158 in the offerings of the website 150, or to solicit additional information from the visitor 158. The lead score of the visitor 158 may cross the threshold value in both the positive and negative direction. Crossing a threshold in the positive direction may indicate that the visitor 158 is expressing increased interest in the website 150, while crossing a threshold in the negative direction may indicate that the visitor 158 is losing interest in the website 150. In either case, the website 150 may need to show content that is more targeted towards the interests of the visitor 158, or the website 150 may need to show content that is more varied in order to find something that the visitor 158 is more interested in viewing. In some embodiments, a threshold score may be determined, which when crossed, may designate the visitor 158 as a qualified lead, i.e., a lead that is ready for more aggressive and/or direct contact with a sales department associated with the website 150. When the lead score of the visitor 158 indicates a qualified lead, the WCMS 100 may be programmed to alert the sales department, to present purchasing opportunities to the visitor 158, or to take any other action that may be calculated to follow up the expressed interest of the visitor 158 with a sales opportunity.

Lead scoring may take various forms, and may depend on a number of different factors associated with the website 150. In some embodiments, a score may be associated with each detectable action taken by a visitor 158 while interacting with the website 150. For example, a value of "25" may be added to the lead score of a visitor 158 every time the visitor 158 downloads a document from the website 150. In this case, the action of downloading the document could be statically programmed into the WCMS 100 such that every instance of downloading the document may increase the lead score of the visitor 158 by 25 points. On the other hand, it may also be beneficial to dynamically determine the appropriate score at the time of the action based on the history of actions by the visitor 158 and how those actions correlate with the interests of the visitor 158. For example, the website 150 may be added to the lead score of the visitor 158 when the visitor 158 downloads three or more documents, in addition to tracking and scoring each of the individual downloads.

In one embodiment, visitor 158 interactions with the website 150 may generally be placed in three categories for scoring: (1) content and media items, (2) actions, and (3) information submissions. Content and media items may include viewing videos, product specifications, sample code, and/or training materials, downloading trial software, white papers, audio or video presentations, or using online resources, such as web forms, online calculators, spreadsheets and/or the like. The action category may include searches, number of visits, frequency of visits, navigation between pages, accessing content through specific web portals, adding items to a resource portfolio, creating a user profile, saving research trials and/or searches in a user profile, and/or the like. Information submissions may include all instances where the visitor 158 provides personal or business information to the website 150, for example, filling out a web form, saving information in a user profile, revealing an association with a business, and/or expressing interest in business solutions associated with the website 150. These categories are illustrative, and not meant to be limiting. It will be understood that these categories may be changed to meet needs and content of each individual organization and website.

Figure 3:
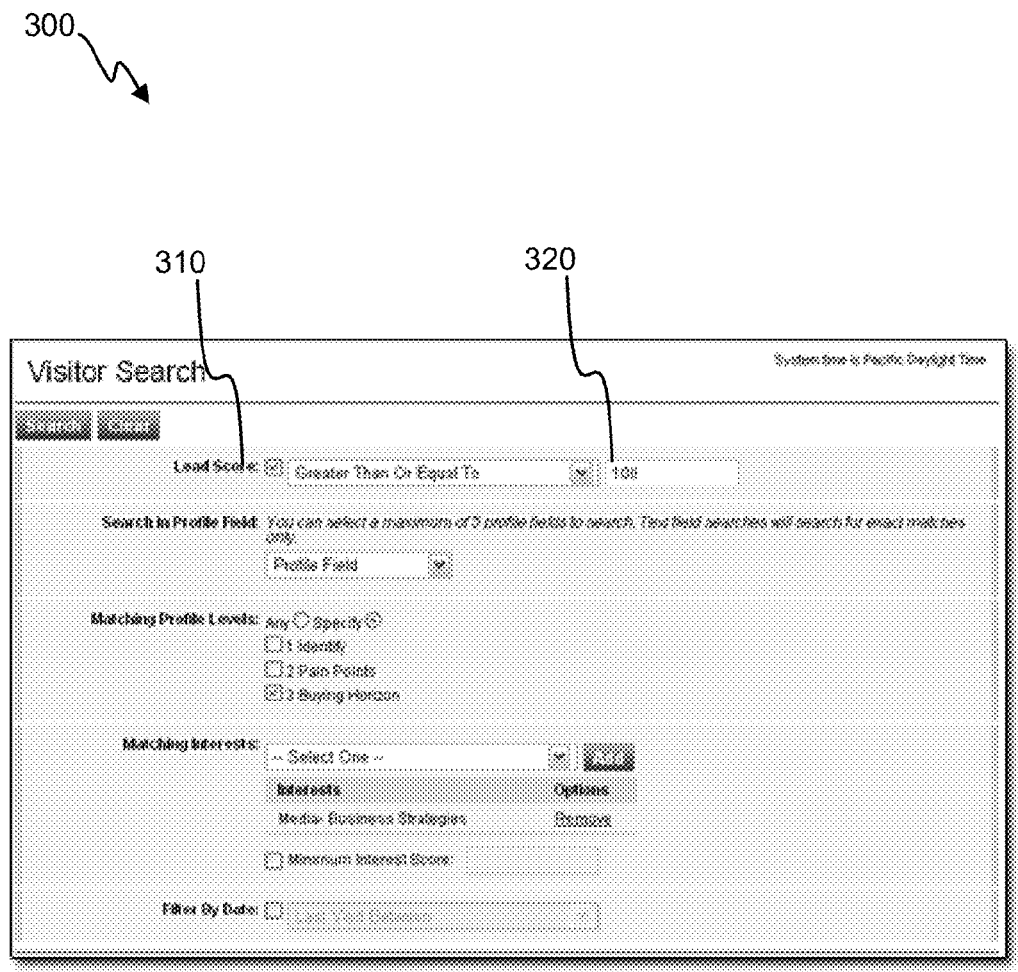
FIG. 3 illustrates an embodiment of an interface for setting and adjusting a lead score.

When a WCMS 100 is used to present a website's content, the score for each type of interaction may be determined within the WCMS 100. A section of the WCMS 100 interface may be set aside for setting the threshold lead scores and the corresponding actions that may be taken in response to the crossing threshold scores. FIG. 3 illustrates one embodiment of an interface for managing a lead score 310. The interface 300 may be a tab within the WCMS 100 that displays a form where the website programmer may set and/or adjust the "qualified lead" score threshold 320. The threshold 320 may be set universally and applied to each visitor 158, or the threshold 320 may be set differently for different classes of visitors 158. For instance, the threshold 320 may be set to "100" for visitors 158 who are unassociated with a business account, while the threshold 320 may be set to "75" for visitors 158 who are associated with a business account, and so forth.

In addition to setting the threshold levels, a WCMS 100 may include an interface for setting the scoring values for each instance of visitor interaction with the website 150. For example, a WCMS 100 may include a means for selecting specific content, media, and/or actions and may assign a lead score value to each type. In one embodiment, a lead score value is set for each content instance of a certain type. For example, when a visitor watches any demonstration video, a score of "10" may be added to the visitor 158's lead score 310 of the visitor 158. Content may be scored collectively based on content type (video, audio, and/or documents) or by content category (products, research, and/or marketing) or by interest of the visitor 158 (solutions for managers). If no score is set for a particular type of interaction, the WCMS 100 may set a default scoring level to apply to each unassigned interaction.

Additionally or alternatively, each instance of a website interaction may be scored individually. One embodiment may allow for assigning specific scores to each instance, such that downloading a first white paper would have a score of "10", while downloading a second white paper could have a score of "15". Assigning values to specific content may be done by a website developer and available to the WCMS 100 through exposed tags in the content code that may be accessible to the WCMS 100, or the scores may be entered into the WCMS 100 by marketers when the content is published to the website 150.

Figure 4:
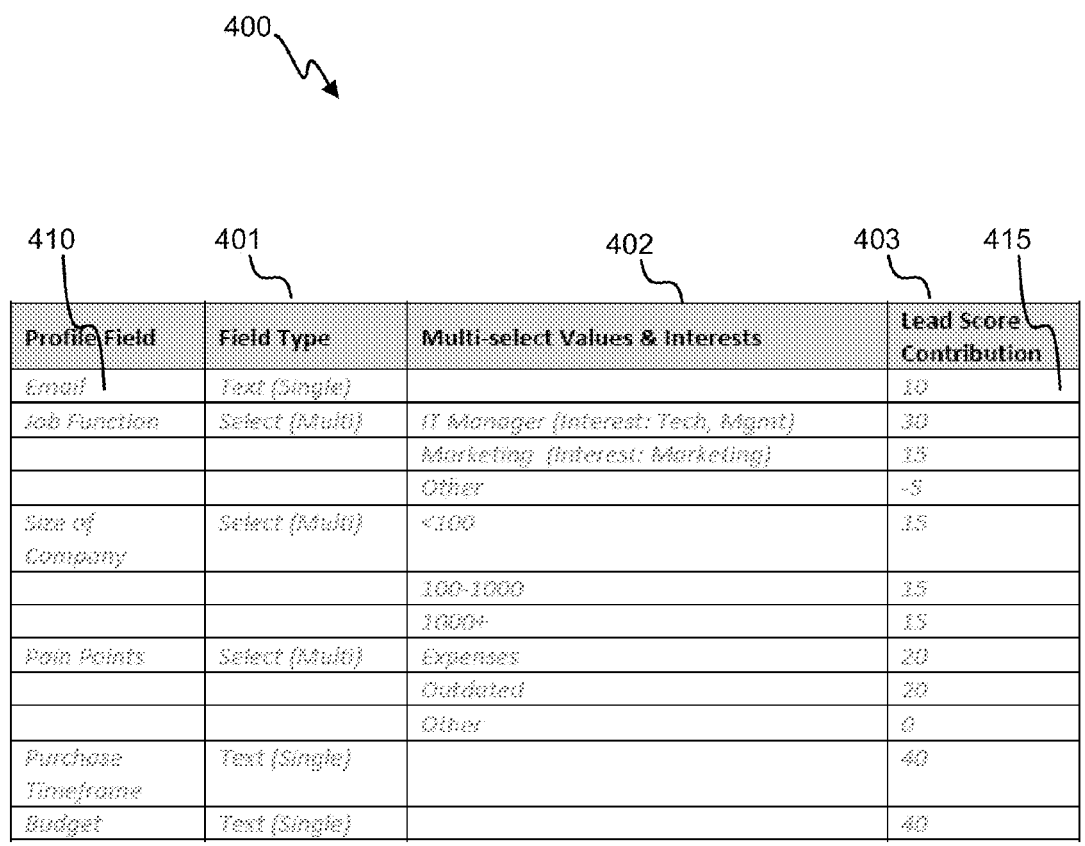
FIG. 4 illustrates an embodiment of an interface for setting individual lead score values associated with user profile information.

Turning to FIG. 4, which illustrates one embodiment of an interface for setting individual lead score values associated with receiving user profile information. Table 400 includes a list of various types of information that may be requested from a visitor 158, such as e-mail, job function, size of company, etc. Column 401 includes a list of various profile fields that may be presented to a visitor 158 in order to elicit the desired information. Column 403 includes an editable list of scores that are associated with each piece of profile field. For example, if a visitor 158 fills out a web form and provides an e-mail address 410, then the associated lead score 415 of "10" could be added to the lead score 310 of the visitor 158.

When determining the lead score values to associate with each type of visitor 158 interaction, it may be advantageous to develop a scoring strategy to avoid overlapping lead score contributions and accurately gauge visitor 158 interest. For example, it may be necessary to divide the lead score points between viewing a page with a download link, clicking on the link, and watching media associated with the link. Additionally, there are a variety of ways to establish, track, and divide lead scores for the website's content and actions. It will be understood that the lead scoring methods described above are merely illustrative.

Progressive Profiles

When a visitor 158 is associated with a user profile, the website 150 may be programmed to collect personal, business and other information from the visitor 158. In a way to similar to how a lead score may indicate the value of a visitor 158 based on their activity on the website 150, a user profile may be incrementally filled with information and indicate a the willingness of the visitor 158 to receive further sales interactions. A progressive profile may be defined as a user profile designed to have a number of different levels corresponding to increasing amounts of information provided by the visitor 158. Progressive profiling enables marketers to capture an increasing amount of information about the visitor 158 over time, incrementally enriching the user profile. Generally, a visitor 158 will gradually complete their profile; however, it is also possible for a visitor 158 to supply a large amount of information in a single session and jump multiple profile levels.

Figure 5:
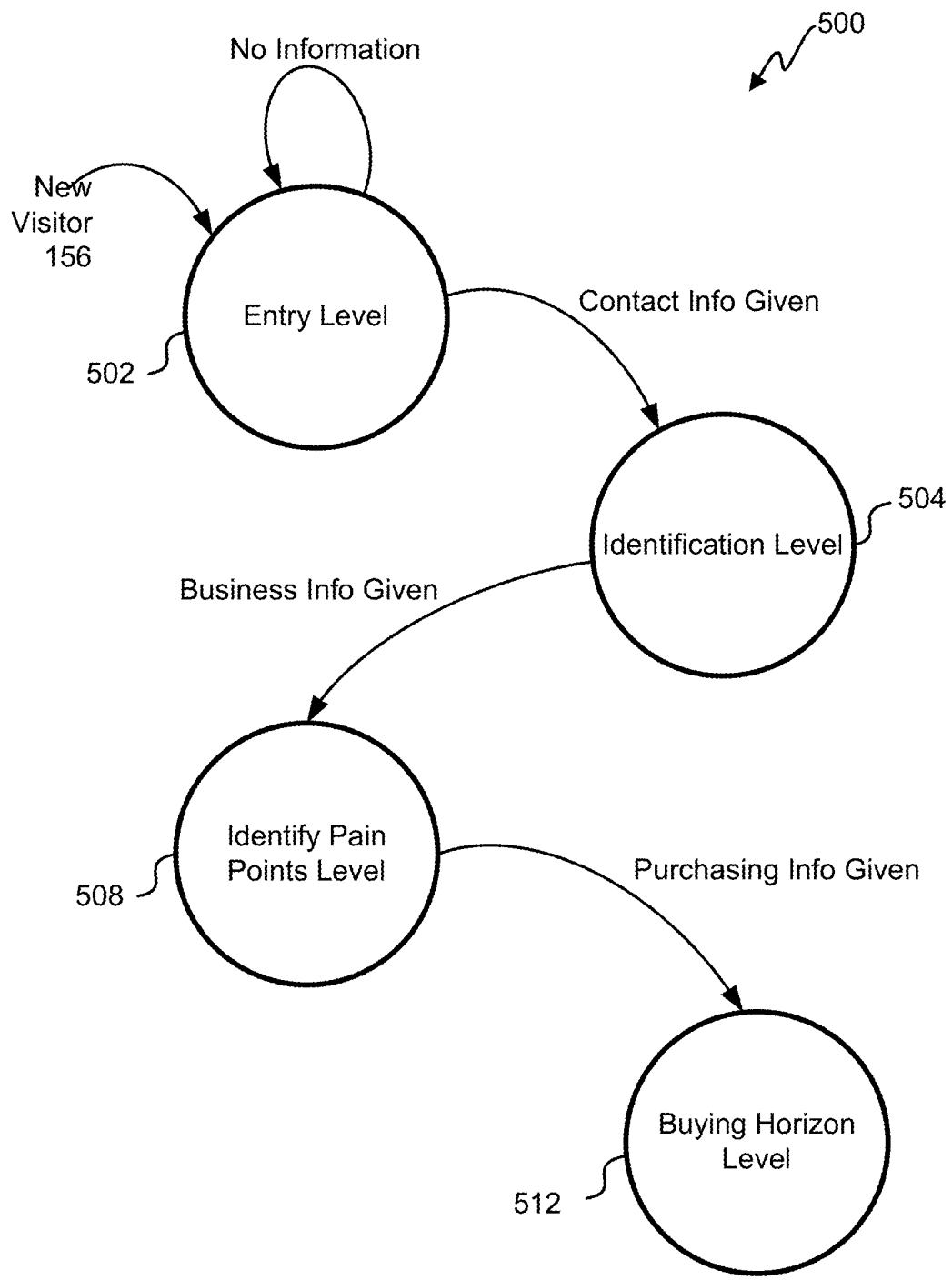
FIG. 5 illustrates an embodiment of a state diagram illustrating a progressive profiling scheme.

In one embodiment, the each profile level is associated with a certain type or number of information fields 402 that must be completed by the visitor 158 before the profile is allowed to progress to the next level. FIG. 5 illustrates an embodiment of a state diagram illustrating a progressive profiling scheme. The progression between the various levels in the progressive profiling scheme 500 depends, at least in part, on the amount of information provided by a visitor 158. When a visitor 158 first encounters the website 150, the visitor 158 may be associated with an anonymous, or entry level profile 502. The entry level profile 502 may be assigned to a new visitor 158, or to a visitor 158 for whom there is very little known information. At a certain point, the visitor 158 may be asked for identifying contact information. If the visitor 158 provides the identifying contact information, the profile progresses to the next level, which may be termed the "Identification Level" 504. Similarly, if the visitor 158 continues to navigate through the website 150 and/or access content, the website 150 may be programmed to present the visitor 158 with the opportunity to provide a second level of information. The second level of information may relate to business needs. If the visitor 158 provides the business needs information, the profile may progress to the next level, which may be an "Identify Pain Points" level 508. Finally, at some point the visitor 158 may be given the opportunity to provide the website 150 with purchasing information. If such information is provided, the profile may progress to a final level termed the "Buying Horizon" level 512.

The example shown in FIG. 5 is merely illustrative, and is not meant to be limiting. It will be understood that many different profile progressions may be used, and that the information required from each level may be tailored to meet the unique needs of a business. For example, a company may require extensive contact information, including first name, last name, username, e-mail, address, city, state, zip, country, company, phone number, fax number, mobile number, website, birth date, and/or ideal contact times, etc. For business information, a website 150 may be programmed to require a business name, industry, size of company, listings of various business interests, revenues, and/or problems that the visitor 158 is attempting to solve. For purchasing information, the website 150 may be programmed to require a budget, purchasing timeframe, role in the purchasing process, purchasing contact, and/or a listing of more specific business interests. These types and categories of information may be enlarged or reduced, and may be subdivided according to the marketing plan of the website owner. In one embodiment, the desired profile fields may first be chosen, and then they may be grouped by type and divided into various progressive profile levels that are arranged according to perceived willingness of the visitor 158 to divulge the information.

Some embodiments present the same profile questions to every visitor 158 associated with a given profile level. However, some embodiments may allow the progressive profile questions to be tailored to the type of visitor 158, such that different visitors may receive different questions at the same level based on information that has already been provided. Certain questions may pertain to, or change depending upon, answers to previous questions. For example, during a request for information, a visitor 158 may be presented with the question "How large is your business?" If the visitor 158 responds with a business size that is larger than a threshold number, then the next question may ask about topics that would only apply to a large business. On the other hand, if the visitor 158's response indicated that the business is comparatively small, then the next question may ask about topics that would only apply to a small business. It will be understood that many variations are possible when segmenting the profile questions into different categories. Some embodiments allow the website 150 to use complex rules for segmenting the order, number, and topics for each profile questionnaire. For example, it is possible to have an interface in the WCMS 100 where rules and alternatives for each question may be selected and tailored to the individual visitor type.

Figure 6:
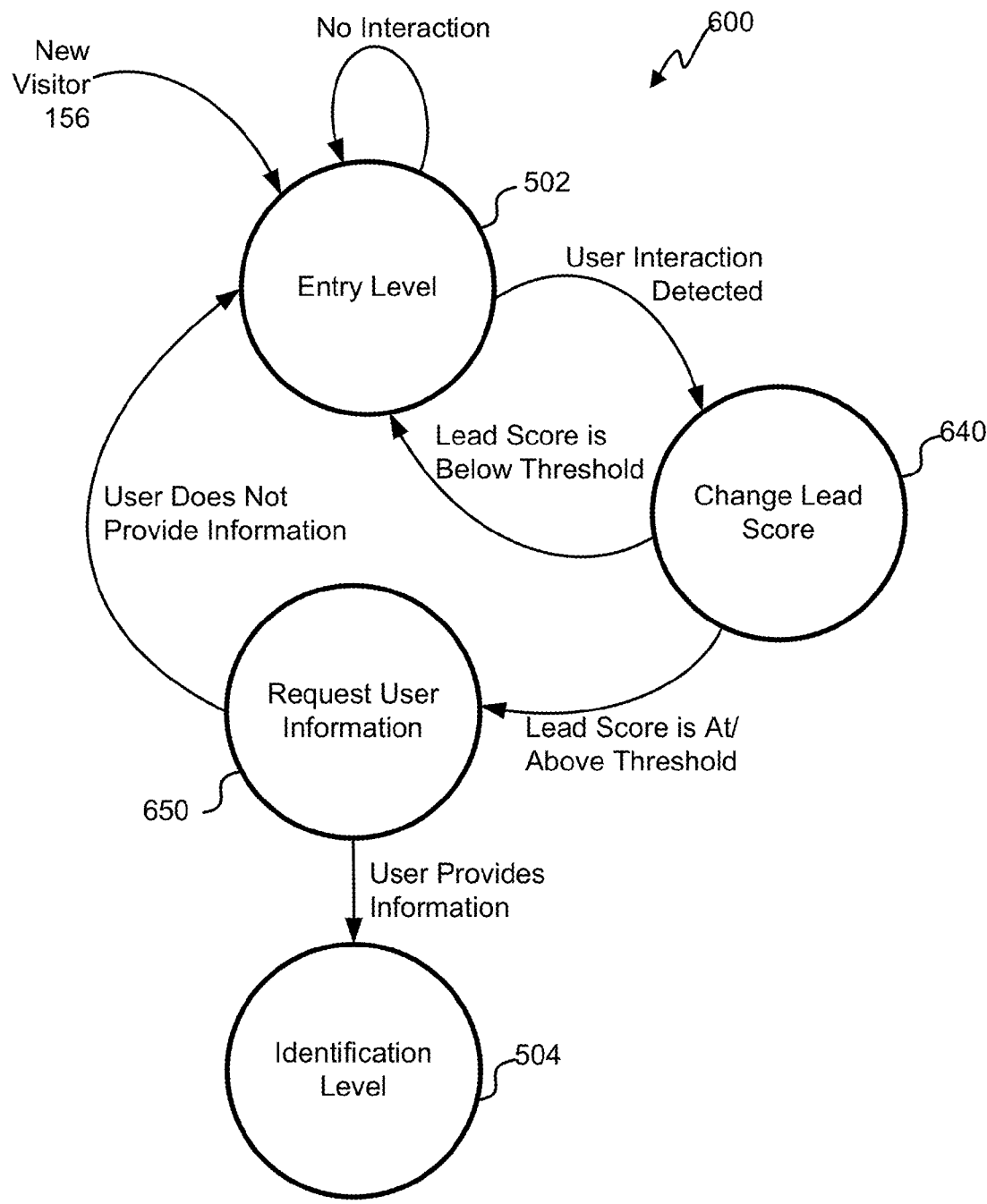
FIG. 6 illustrates an embodiment of a state diagram for a progressive profile system.

In some embodiments, the profile levels/information and lead score 310 of the visitor 158 may both be stored in the user profile of the visitor 158, yet these two measurements of lead progress may be largely independent of each other. However, in one embodiment, the lead score may be used to trigger the requests for visitor 158 information required to progress through the profile levels. Turning now to FIG. 6, which illustrates an embodiment of a state diagram for a progressive profile system that uses the lead score of a visitor 158 to trigger requests for visitor 158 information and profile level advancement. When a visitor 158 first encounters the website 150, the visitor 158 may be associated with an entry level profile 502. As the visitor 158 interacts with the website 150, the visitor's lead score may increase and decrease based on the types of interactions in state 640. So long as the lead score of the visitor 158 stays below the threshold, no action will be taken, and the visitor 158 will persist in the "Entry" profile level 502. If at some point the lead score of the visitor 158 meets or exceeds the threshold, the website 150 may present the visitor 158 with the opportunity to provide contact information to the website 150 in state 650. If the visitor 158 provides the requested information, the profile level of the visitor 158 may increase to the "Identification" level 504. On the other hand, if the visitor 158 fails to provide the requested information, the profile level of the visitor 158 may revert back to the "Entry" level 502. If the user profile level reverts back to the "Entry" level 502, then the visitor 158 may be presented with a similar information request each subsequent time that a visitor 158 interaction is detected and the score increases above the threshold value. Alternatively, the lead score of the visitor 158 may be reset or reduced to the threshold of the current level, or the threshold value of the next level may be increased to allow for more navigation before the next information request is made.

Other factors may be used in addition to using the lead score of the visitor 158 as a mechanism to trigger presenting the visitor 158 with an information request. In some embodiments, a specific type of visitor 158 interaction, such as accessing a specific section of content may trigger an information request, even if the lead score of the visitor 158 has not yet reached the threshold value. In this case, content may be "gated" such that only visitors who have achieved a certain profile level may be allowed to access the gated content. For example, in order to access a demonstration video of a product solution on the website 150, a visitor 158 may be required to provide enough information to have progressed past the first profile level. If the visitor 158 has already provided enough information to move to the second profile level, then the visitor 158 may be able to access the content. If instead the visitor 158 has not yet provided enough information to move beyond the first profile level, then the visitor 158 may be diverted from the demonstration video and given an opportunity to provide the requested information. If the information is provided at this time by the visitor 158, the visitor 158 may be given access to the demonstration video. On the other hand, if the visitor 158 does not provide all of the requested information, the website 150 may deny access to the demonstration video, or it may grant some form of limited access, such as a one-time viewing of the demonstration video. Using gated content in this manner may entice the visitor 158 to provide information to the website 150 that the visitor 158 might otherwise be reluctant to divulge.

When using gated content as described above, it may be necessary for the visitor 158 to ascend through two or more profile levels during the same interaction. For example, if the visitor 158 attempts to access content that has been gated at a certain profile level, then the visitor 158 may be required to provide information required for each profile level between the current level of the visitor 158 and the level required to access the content. Turning back to FIG. 5, if a visitor 158 with an "Entry" level profile 502 has attempted to access content gated at the "Identify Pain Points" level 508, the visitor 158 would be presented with the opportunity to provide information required to advance to both the "Identification" level 504 and the "Identify Pain Points" level 508. These requests could be presented simultaneously in the same web form, or they could be presented sequentially, so that if the visitor 158 fills out the "Identification" level information, but chooses not to fill out the "Identify Pain Points" level information, the profile level of the visitor 158 may still increase to the "Identification" level 504. If enough information is provided to advance the visitor 158 at least one profile level, but not enough is provided to advance the visitor 158 to the profile level required by the gated content, then the website 150 may block access to the content, provided limited access to the content, or it may provide full access to the content.

In addition to ascending multiple levels when gated content is accessed, it may also be possible to ascend multiple profile levels when information is imported from a business account or discovered via an IP address. When a user profile is associated with a business account, information from the business account may be associated with the user profile, or the information may be imported and stored in the user profile. If all of the information required for a profile level is imported or available from a business account, then the profile level of the visitor 158 may be increased without requiring the visitor 158 to provide any additional information.

Additionally, if only a portion of the information required for a certain level is included in the business account, then only the remaining information may need to be requested from the visitor 158 to ascend to the profile level. Such a request may occur when the profile trigger event occurs, when the visitor 158 accesses gated content at that level. Additionally, the visitor 158 may be given the opportunity to immediately supply the information when the relationship is established with the business account. Similarly, if information about the visitor 158 is received by using the IP address of the visitor 158, the profile level may be increased in the same way.

Figures 7A, 7B:
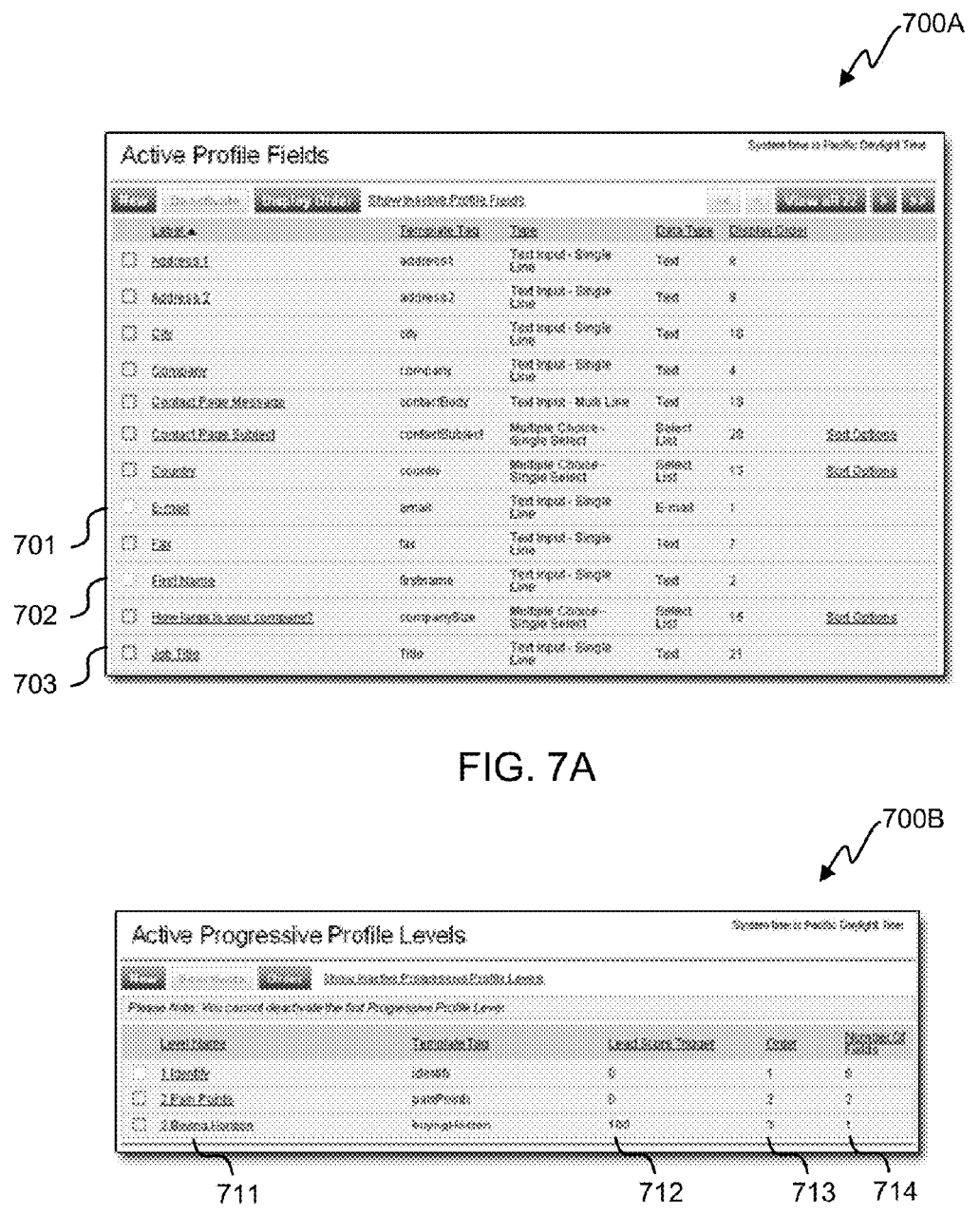

In some embodiments, the various profile levels, with their associated trigger events and information requests, may be established and adjusted within the WCMS 100. Turning now to FIG. 7A, which illustrates an embodiment of an interface for selecting information fields for a profile level. The interface 700A includes a subset of information fields that may be included in a request to the visitor 158. For example, it is possible to select the "First Name" 702, "Job Title" 703, and "E-mail" 701 fields as information required to progress to the "Identification" level 502 of the profile progression. It is understood that many different information fields may be displayed and selected, and that the listing in FIG. 7A is merely illustrative. FIG. 7B illustrates an embodiment of an interface in the WCMS 100 for selecting the trigger events for each profile level. The interface 700B makes it possible to define and name a number of discrete levels 711. The interface 700B also allows for the selection of a lead score 712 that may act as a trigger for each level, 711 as well as an order of progression 713 between the profile levels 711 and the number and types of information fields 714 required for each profile level 711. Other embodiments may use different styles and methods of creating and adjusting progressive profiles.

Interests

In addition to tracking the lead score, profile level, business account, and provided information, some embodiments of the current invention also determine and/or solicit a set of interests from a visitor 158. "Interests" as used herein, represent the classification of visitors. For example, interests may map to different types of personas that the website 150 is intended for. Interests could also map to different business solutions offered by the website 150, or to main verticals served by the operator of the website 150.

It may be useful to draw a distinction between the interest assignment and utilization that takes place in certain embodiments described herein and the "suggested products" or banner advertisements that are often displayed on retail websites. The interests in this invention are not based on the physical or other characteristics of products viewed by a customer, nor are they based on activity on websites outside of the immediate domain of the business website 150 used by these embodiments. The interests of these embodiments are ultimately used to identify business problems that the visitor 158 is concerned with and to link them to business solutions provided by the organization of the website 150 in the business-to-business market context. Unlike most advertisers that track visitors 158 across various sites without recording identifiable information, the interests of these embodiments rely heavily on identifying information provided by a visitor 158, and refine the interests based in this information with each successive interaction with the website 150.

For example, Google's AdSense software attempts to produce advertisements based on tracking a user's web interaction over a numerous sites without recording identifying information. In contract, the embodiments of the lead management system in this invention rely heavily on person information provided voluntarily from a visitor 158, and only uses that information within the single website 150 administered by the WCMS 100. Additionally, embodiments of the lead management system of this invention attempt to match business solutions offered by the website 150 to the business associated with each visitor 158, while advertising software targets retail products for individual purchasers. While the website 150 using these embodiments may include advertisements administered by third parties such as Google's AdSense, no data would be shared, the products would be very dissimilar, and the two systems would operate on completely different principles.

The number and types of interests may vary, and may be tailored to the needs of each individual business. Typically, the number of interests will be small compared to the number of categories for content on the website 150. In one embodiment, the website 150 content is first divided into categories, and then visitor 158 interests are established independently. The number of categories may correspond to individual products, departments, types of media, authors of documents, etc., and these categories may be extensive. In comparison, the website 150 may only have a few interests corresponding to the different major problems that are addressed by the business solutions of the website 150.

Figure 8:
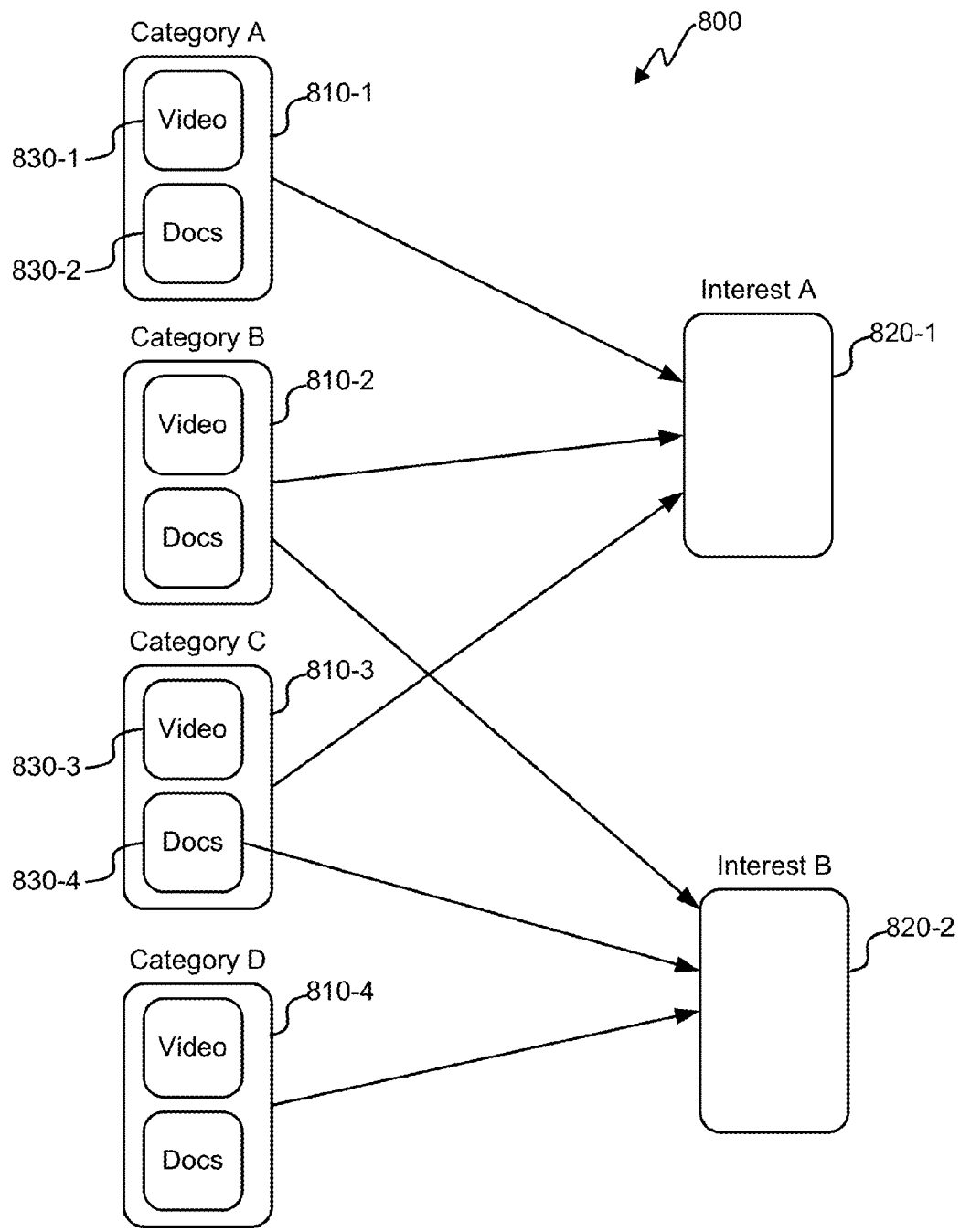
FIG. 8 illustrates one embodiment for relating interests to categories of content.

One method for determining the interests of a visitor 158 is to track the interactions of the visitor 158 with the website 150. Content and navigation actions can be related to one or more interests, and those interests may then be related to the visitor 158. FIG. 8 illustrates one embodiment for relating interests to categories of content. Each instance of content, such as a document 830-2 or a product video 830-1, is assigned to at least one content category 810. Each content category 810 may then be associated with one or more interests 820. A content category, such as category B 810-2, may be associated with more than one interest, such as Interest A 820-1 and Interest B 820-2. For example, a series of white papers may be related to an interest named "Marketing Solutions" and related to an interest named "Management Solutions." Individual instances of content within a category may also be assigned to an interest in addition to, or in the place of, the interest assignments of the content category. For example, document 830-4 may be individually assigned to Interest B 820-2, while the rest of the content in category C 810-3 may be associated with Interest A 820-1. In another example, document 830-4 may be assigned to both Interest A 820-1 and Interest B 820-2, while the rest of the content in category C 810-3 may be only associated with Interest A 820-1.

As a visitor 158 interacts with the website 150 by accessing content, the interests associated with the content may be imputed to the visitor 158. In one embodiment, after a visitor 158 has accessed a threshold number of content items associated with an interest, that interest may be recorded in the user profile of the visitor 158 as an interest for the visitor 158. A visitor 158 may be assigned multiple interests. Assigning an interest may depend on quantity, frequency of access, and a comparison to other interests. For example, if a visitor 158 accesses three different documents all pertaining to a single interest, that interest may be assigned to the visitor 158. On the other hand, if in addition to those three documents, the visitor 158 accessed ten documents in each of two different interests, then the later two interests may be assigned to the visitor 158 instead of the first interest because the visitor 158 exhibited more interest in the latter two interests by comparison. It will be understood that interests may be dynamically assigned and unassigned to each visitor 158 based on the continued interactions by the visitor 158 and his/her expression of interests.

In addition to determining the interests of a visitor 158 based on the interactions of the visitor 158 with the website 150, some embodiments also determine interests both implicitly and explicitly from the user profile of the visitor 158. When a visitor 158 provides certain types of information, such as business type, business role, business size, and/or various "pain points" (business problems in need of a solution), this information may lead to the assignment of one or more interests. For example, if the interests of the website 150 are related to the business role of the visitor 158, such as manager, IT specialist, or marketing and sales representative, then a visitor 158 who selects a business role that can be mapped to one of these website 150 interests, and the interest may be assigned to the user profile of that visitor 158. The interests of a visitor 158 may also be explicitly assigned by presenting the visitor 158 with a listing of interests during a request for information when the visitor 158 attempts to ascend to a higher profile level. A visitor 158 who selects categories of interests may be assigned those interests. Alternatively or additionally, assignment of an interest that is explicitly chosen by a visitor 158 may be overridden by the interactions of the visitor 158 with the website 150, or vice versa. For example, if a visitor 158 selects an interest corresponding to marketing and sales, but the interactions of the visitor 158 exhibit only an interest in management solutions, then the marketing and sales interest may be replaced or supplemented by the management solutions interest.

A visitor 158 may also be assigned interests based on an association with a business account. A business account may have interests assigned to it in the same way that a visitor 158 is assigned interests. Information provided by the business may reveal, either implicitly or explicitly, that the business is concerned with particular interests. Additionally, a business account may be assigned interests based on the interactions and information provided by visitor 158 associated with the business account. For example, if a large number of visitors associated with a single business account express or demonstrate an affinity for a particular interest, then that interest may be assigned to the business account. Similarly, each individual visitor 158 who is assigned to the business account may be linked to the interests of the business account. Interests that are passed between visitors and a business account may be dynamically updated based on new activity and usage thresholds. For example, if a business account is assigned a marketing and sales interest, but each visitor 158 who is subsequently associated with the business account expresses or displays an interest in management solutions, then the marketing and sales interest may be removed from the business account, as well as from each of the individuals associated with the account. This example is merely illustrative, and it will be understood that many different methods may be used to tailor the assignment and updating of interests between visitors and businesses according to the individual needs of the organization of the website 150.

Figure 9:
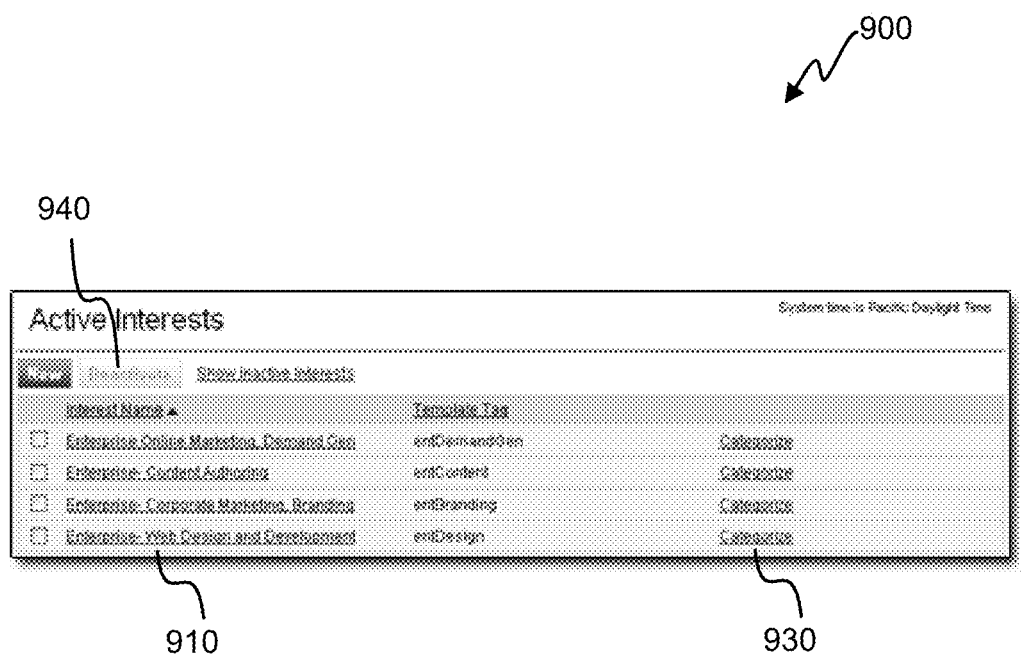
FIG. 9 illustrates an embodiment of an interface for creating and assigning interests.

Interests may be assigned, updated, and determined according to fields in an interface within the WCMS 100. FIG. 9 illustrates an embodiment of an interface for creating and assigning interests. The interface 900 includes a listing of interests 910 that have been created within the WCMS 100. Interests may be added or removed from the list using the buttons 940 on the interface 900. Each interest 910 may be assigned to one or more categories of content on the website 150 using a categorize link 930 that allows for the assignment of interests to categories. Of course, many different types of interfaces are possible, and interests may be created and assigned in alternative ways. For example, each content instance could be assigned to an interest by a content designer or web programmer.

Using Interests, Profiles, and Lead Scores Create Qualified Sales Leads

Although they are stored in separate fields, it should be apparent that a visitor 158's lead score, profile information, and interests are inter-related in how they are assigned and accumulated in this invention throughout the interaction of a visitor 158 with a website 150. Additionally, the lead score, profile information, and interests can be used to tailor the experience of a visitor 158 with the website 150, to guide the visitor 158 to business solutions that are most likely to meet the business needs of the visitor 158, and to create a qualified lead to be passed on to the sales department of the website's organization.

As interests are assigned to a visitor 158 and profile information is obtained, the website 150 may provide for conditional content to tailor the experience of the visitor 158. As described earlier, some content may be gated, such that the visitor 158 is required to provide information and raise their profile level before the gated content may be accessed. If the visitor 158 fails to provide the required information, the visitor 158 may instead be presented with alternative content based on the interests of the visitor 158 or partial profile information that may be designed to entice the visitor 158 to provide the required information and view the originally requested gated content. Also, content could be dynamically presented based on the lead score of the visitor 158. For example, content X could be displayed for visitors with a low lead score, whereas content Y may be displayed for more engaged visitors with a higher lead score. In another example, a simpler, more streamlined interface may be displayed for a new visitor 158 with a low lead score, whereas a more complete and/or detailed interface may be used for a more engaged visitor 158 with a higher lead score.

Featured solutions, articles, and/or marketing videos may also be dynamically displayed based on the interests and/or profile of the visitor 158. As the interests of a visitor 158 are identified, the website 150 may dynamically display content that is tagged with the interests of the visitor. For example, the visitor 158 may have an interest named "Corporate Branding and Marketing." On the home page of the website 150, the business solutions and content related to "Corporate Branding and Marketing" may be prominently displayed, and additional white papers, demonstration videos, and/or more advanced materials may be added to the areas of the website 150 dedicated to that interest. Also, a user profile may include geo-location data based either on the physical address of the visitor or on a detected IP address. For example, the website 150 may present solutions, information, or live seminars or demonstrations that are located in the same geographic region as the visitor 158.

In additional to tailoring the content, the layout of the website 150 may change according to the interests and lead score of the visitor 158. In some embodiments, the links on the website 150 may be presented in a different order or prominence to emphasize the areas of the website 150 that correlate strongest with the interests of the visitor 158. Additional content and hyperlinks may become available that align with the interests of a visitor 158 as they are identified. In other embodiments, the lead score or profile level of a visitor 158 may determine the amount of the website 150 that is available. For example, a new visitor 158 with a low lead score and/or a low profile level may be presented with fewer hyperlinks, whereas a more engaged visitor 158 and/or a visitor 158 with a higher profile level may have more hyperlinks presented in order to open up more of the website 150 for exploration.

The tailoring of the layout of the website 150 and the content presented to the visitor 158 described above utilizes the profile and/or interests of the visitor 158. However, it is also possible to tailor the layout and content of the website 150 for a visitor 158 who is anonymous when he/she first interacts with the site using the IP mapping techniques also described above. A visitor 158 who is anonymous may not have any information stored in the associated user profile when first accessing the website 150, but when the IP address of the visitor 158 is detected, profile information may be used to populate the user profile of the visitor 158. This information may be used to tailor the content and/or layout of the website 158 on the first visit of the visitor 158 to the website 150, even though the visitor 158 has not yet provided any information to the website 150. Thus, the visitor 158 may be presented with content and layouts that are of interest to the visitor 158 without the visitor 158 needed to take any action other than to visit the website 150.

An option may also exist for a visitor 158 to save content and links in a resource portfolio. A resource portfolio may be an area where highly targeted content can be saved and viewed by the visitor 158, and it is stored in association with the user profile of the visitor 158. A resource portfolio may include content that has been saved by the visitor 158 for easy reference, e.g., by using a link or button on the website 150 that displays a message similar to "save this item to my resource portfolio." It may also include content that is related to content that the visitor 158 has saved and/or viewed. It may also include content that is personally targeted to the particular visitor 158, or to visitors associated with a business account, by a marketer or salesperson associated with the operator of the website 150. The resource portfolio may also include content that is suggested based on the interests of the visitor 158. For example an interest in "Corporate Branding and Marketing" may automatically produce content and/or links to content in the resource portfolio that is tagged with the "Corporate Branding and Marketing" interest. The name "resource portfolio" is merely descriptive of this feature's functionality, and it will be understood that any name can be displayed for the visitor 158 based on the desired aesthetics or look and feel of the website 150.

As described above, the requests for information from the visitor 158 may come in the form of a web form to be filled out by the visitor 158. The questions may change or be presented in a different order based on the interests or lead score of the visitor 158. At a point where the interests of the visitor 158 have been sufficiently established, or when the lead score of the visitor 158 reaches a certain threshold, the profile questions may become more directed towards establishing a sales contact with the visitor 158. For example, advanced questions may be presented on forms entitled something to the effect of "Contact Us", "Request a Demo", or "Register for a Webinar".

In some embodiments, the visitor 158 may be allowed to view, modify, or add to the user profile of a visitor 158. For instance, if the visitor 158 reaches a certain profile level, reaches a certain threshold lead score, or explicitly requests access to the user profile, the website 150 may allow the visitor 158 to access at least some of the information that has been stored in the user profile. This may allow the visitor 158 to correct any incorrect assumptions regarding the interests of the visitor 158. Or, it may allow the visitor 158 to select interests in areas that the visitor 158 has not yet explored on the website 150, such that content and navigational links may be available when the visitor 158 chooses to investigate that interest. Access to the user profile information may be made available to a visitor 158 via a form, link, or tab on the website 150, such as a "My Profile" page or link. The user profile may be accessed via a user name and password that is individual to each visitor 158. Alternatively, the user profile may be accessed via user credentials that are shared between at least some of the visitors that are related to a single business account.

Figure 10:
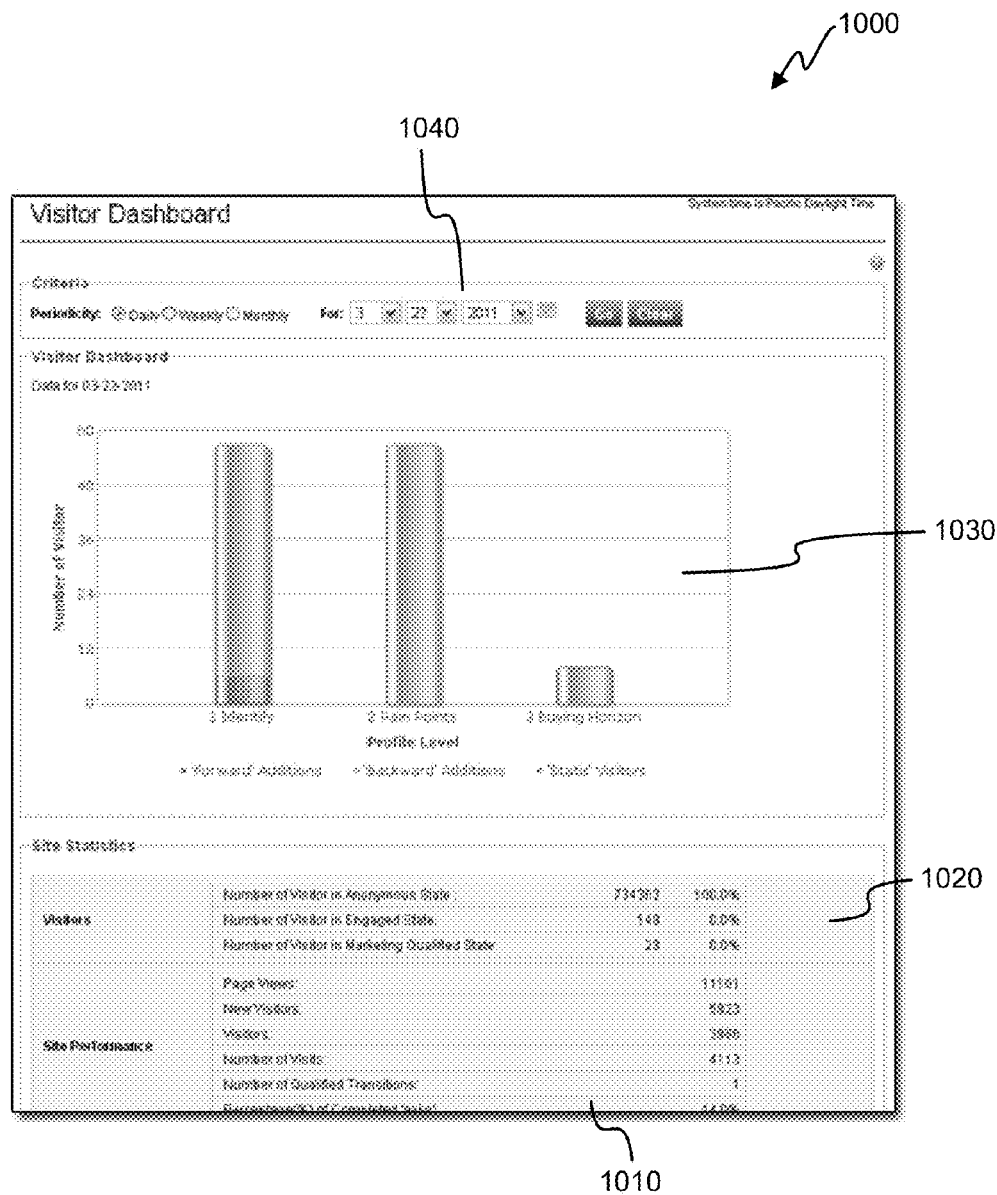
FIG. 10 illustrates an embodiment of an interface for displaying statistical information regarding visitor activity and website performance.

Another use for the profile, interest, and/or lead score data is to provide feedback about the performance of the website 150. One goal of the profile, interest, and lead score system is to help visitors progress from their first interaction through various profile levels until the visitor 158 is determined to be a qualified lead and ready for contact from a sales representative. By tracking visitors and storing information in a user profile, data can be presented that may diagnose where how well the website 150 is progressing visitors to become qualified leads. FIG. 10 illustrates an embodiment of an interface displaying statistical information regarding visitor 158 activity and website 150 performance. A visitor dashboard 1000 may include a number of options for manipulating and displaying data related to visitor 158 progression. For example, there may be controls 1040 for choosing a range a dates, type of visitor, and/or visitors associated with a particular interest. The visitor dashboard 1000 may also include various ways of displaying the visitor statistics, such as a graph 1030 illustrating the number of active visitors that are at each profile level. There may also be statistics displaying distributions 1020 of visitors who have become engaged with the website 150 and/or progressed on to become a qualified lead. Other statistics may be displayed in a summary window 1010, which might display data such as the number of new visitors, the number of page views, and completion percentage for each level of requested information. It will be understood that many types of statistics may be displayed depending of the particular website 150, and that there may be many different ways to display these statistics according to the needs of the individual businesses using these embodiments.

One of the main objectives of tracking interests, profiles, and/or lead scores is to generate qualified leads. Relying on lead scoring alone may result in visitors being qualified as a lead by accumulating a lead score that exceeds the lead score threshold, but for which very little information is known. By ascertaining a lead's interests, a qualified lead may be approached with specific products and by specific people with an expertise in the areas that match the interests of the visitor 158. Additionally, by progressively creating a user profile, the visitor 158 may be immediately contacted once qualified as a lead. This makes the transition from being a visitor 158 on a website 150 to a qualified lead much more seamless, such that the visitor 158 may not even be aware that such a transition has been made. Without progressive profiling, the visitor 158 would be forced to provide all the information at once during the transition to become a qualified lead. Such a scenario may be overwhelming to the visitor 158 and cause the visitor 158 to exit the website 150 before enough of information and/or interests could be ascertained for a successful sales pitch.

Figure 11:
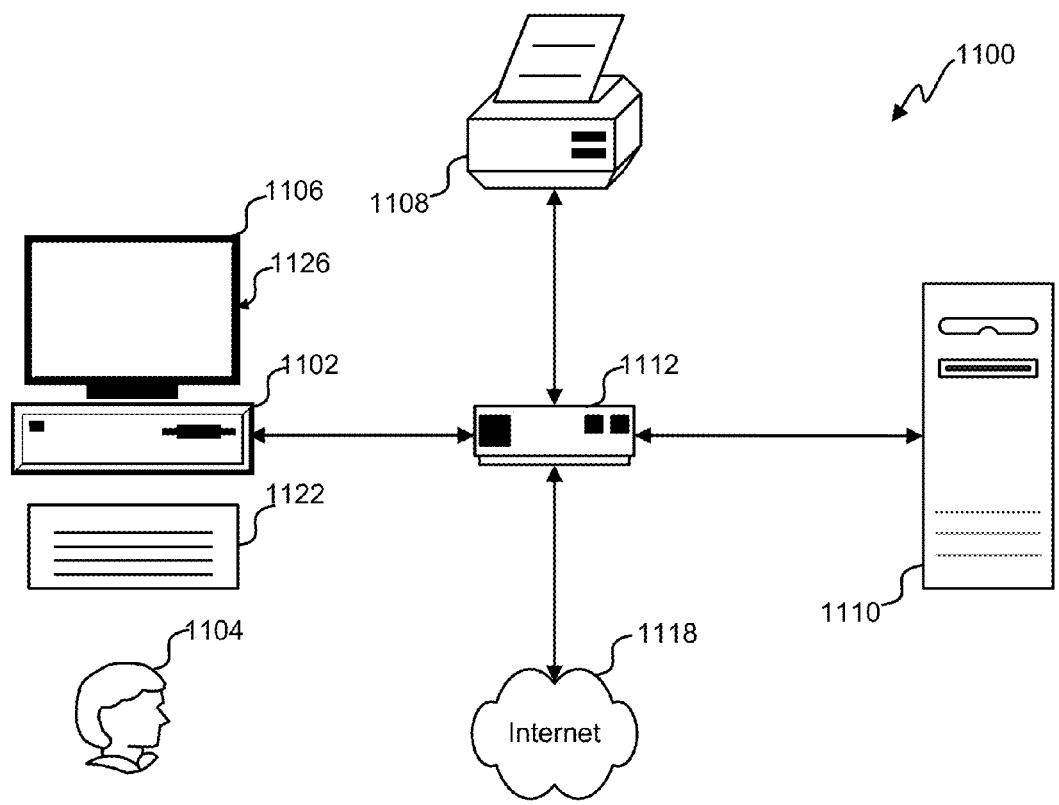
FIG. 11 illustrates an environment with which embodiments may be implemented with a computer system.

The ways in which the lead scores, progressive profiles, and/or interests have been combined above are merely examples of ways in which these data may be used to effectively generate qualified leads. It will be understood that many other combinations of data may be collected and put to uses other than those described herein. Each website 150 may have its own designs and sales objectives for which these embodiments may be tailored in order to meet various business needs. Also, customization of a website 150 is described using a WCMS 100, but the same customizations could be performed by application software, a run-time applet, a smart phone application, or any software functions that provide information to potential customers and website owners. Therefore, these embodiments are not limiting, and should be considered only to be a few of many possible embodiments.
Hardware and Software Referring next to FIG. 11, an exemplary environment with which embodiments may be implemented is shown with a computer system 1100 that can be used by a designer 1104 to design, for example, electronic designs. The computer system 1100 can include a computer 1102, keyboard 1122, a network router 1112, a printer 1108, and a monitor 1106. The monitor 1106, processor 1102 and keyboard 1122 are part of a computer system 1126, which can be a laptop computer, desktop computer, handheld computer, mainframe computer, etc. The monitor 1106 can be a CRT, flat screen, etc.

A designer 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
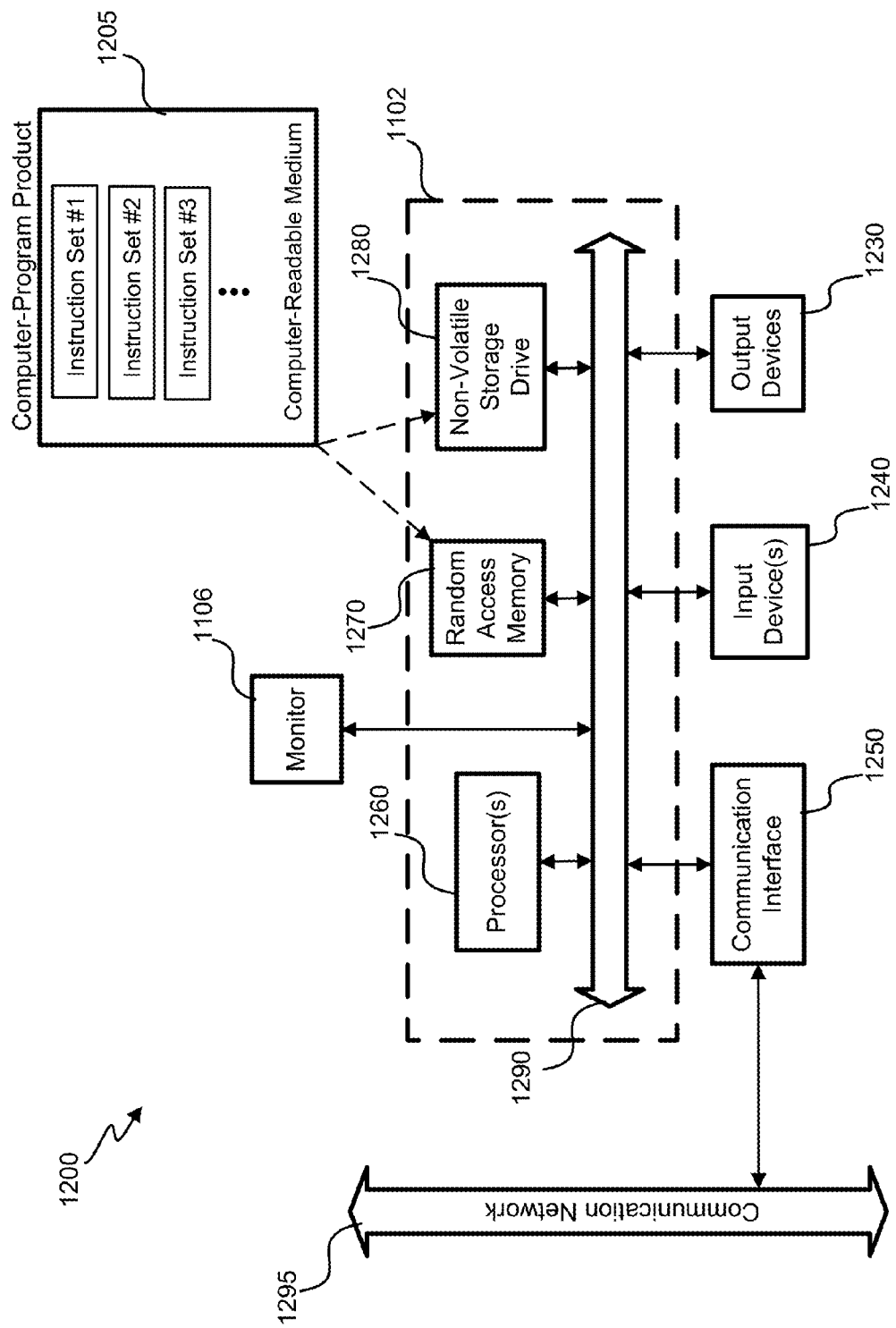
FIG. 12 illustrates an embodiment of a special-purpose computer system.

With reference to FIG. 12, an embodiment of a special-purpose computer system 1200 is shown. The lead management system 108 and marketing automation system 112 are examples of a special-purpose computer system 1200. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose computer system 1200.

Special-purpose computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs system 1200 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft Corporation, Solaris® from Sun Microsystems, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of analyzing Internet-based communication sessions using group profile states representing an aggregated function of individual electronic transmissions, the method comprising:
    detecting, by a computer system, one or more interactions between a web server and a first client device, wherein the one or more interactions are part of a first communication session;
    detecting, by the computer system, a characteristic associated with the communication session;
    identifying, by the computer system, a second communication session that is also associated with the characteristic, wherein the the second communication session is associated with a second client device;

accessing, by the computer system, or generating a group profile that is associated with the second communication session, where: the group profile is assigned a first group profile state in a state-machine-based progression of group profile states, and the group profile is associated with a group lead score;

associating, by the computer system, the first communication session with the group profile;

adjusting, by the computer system, the group lead score based on the one or more interactions between the web server and the first client device;

determining, by the computer system, that adjusting the group lead score caused the group lead score to cross a threshold value;

moving, by the computer system, the group profile from the first group profile state to a second group profile state in response to the group lead score crossing the threshold value; and authorizing, by the computer system, the first client device and the second client device to access additional data content of the web server in response to moving the group profile to the second group profile state.

2. The method of analyzing Internet-based communication sessions using group profile states representing the aggregated function of individual electronic transmissions of claim 1, wherein detecting a characteristic associated with the first communication session comprises receiving an Internet Protocol (IP) address.

3. The method of analyzing Internet-based communication sessions using group profile states representing the aggregated function of individual electronic transmissions of claim 2, wherein detecting the characteristic associated with the first communication session further comprises:

sending, by the computer system, the IP address to an external data source;

receiving, by the computer system, an indication of the characteristic from the external data source.

4. The method of analyzing Internet-based communication sessions using group profile states representing the aggregated function of individual electronic transmissions of claim 1, wherein detecting the characteristic associated with the first communication session is based on the one or more interactions between the web server and the first client device.

5. The method of analyzing Internet-based communication sessions using group profile states representing the aggregated function of individual electronic transmissions of claim 1, wherein the characteristic comprises a geographic location.

6. The method of analyzing Internet-based communication sessions using group profile states representing the aggregated function of individual electronic transmissions of claim 1, wherein the characteristic comprises a relationship with an organization.

7. The method of analyzing Internet-based communication sessions using group profile states representing the aggregated function of individual electronic transmissions of claim 1, wherein the characteristic comprises a demographic characteristic.

8. The method of analyzing Internet-based communication sessions using group profile states representing the aggregated function of individual electronic transmissions of claim 1, further comprising:

detecting, by the computer system, interactions between the Web server and the second client device;

adjusting, by the computer system, the group lead score based on the interactions between the web server and the second client device;

determining, by the computer system, that adjusting the group lead score caused the group lead score to cross a second threshold value;

moving, by the computer system, the group profile from the second group profile state to a third group profile state in response to the group lead score crossing the second threshold value; and authorizing, by the computer system, the first client device and the second client device to access second additional data content of the web server in response to moving the group profile to the third group profile state.

9. The method of analyzing Internet-based communication sessions using group profile states representing the aggregated function of individual electronic transmissions of claim 1, further comprising authorizing, by the computer system, additional client devices that are associated with other communication sessions in the group profile to access the second additional data content of the web server in response to moving the group profile to the second group profile state.

10. A non-transitory, computer-readable medium comprising instructions that, when executed by one or more processors, cause the one or more processors to analyze Internet-based communication sessions using group profile states representing an aggregated function of individual electronic transmissions by:

detecting one or more interactions between a web server and a first client device, wherein the one or more interactions are part of a first communication session;

detecting a characteristic associated with the first communication session;

identifying a second communication session that is also associated with the characteristic, wherein the second communication session is associated with a second client device;

accessing or generating a group profile that is associated with the second communication session, wherein: the group profile is assigned a first group profile state in a state-machine-based progression of group profile states; and the group profile is associated with a group lead score;

associating the first communication session with the group profile;

adjusting the group lead score based on the one or more interactions between the web server and the first client device;

determining that adjusting the group lead score caused the group lead score to cross a threshold value;

moving the group profile from the first group profile state to a second group profile state in response to the group lead score crossing the threshold value; and authorizing the first client device and the second client device to access additional data content of the web server in response to moving the group profile to the second group profile state.

11. The non-transitory, computer-readable medium of claim 10, wherein detecting a characteristic associated with the first communication session comprises receiving an Internet Protocol (IP) address.

12. The non-transitory, computer-readable medium of claim 10, wherein detecting the characteristic associated with the first communication session is based on the one or more interactions between the web server and the first client device.

13. The non-transitory, computer-readable medium of claim 10, wherein the characteristic comprises a selection from the group consisting of: a geographic location, a demographic characteristic, and a relationship with an organization.

14. The non-transitory, computer-readable medium of claim 10, wherein the instructions further cause the one or more processors to operate by authorizing additional client devices that are associated with other communication sessions in the group profile to access the second additional data content of the web server in response to moving the group profile to the second group profile state.

15. A system comprising:
one or more processors; and
a non-transitory, computer-readable medium comprising instructions that, when executed by the one or more processors, cause the one or more processors to analyze Internet-based communication sessions using group profile states representing an aggregated function of individual electronic transmissions by:
detecting one or more interactions between a web server and a first client device, wherein the one or more interactions are part of a first communication session;
detecting a characteristic associated with the first communication session;
identifying a second communication session that is also associated with the characteristic, wherein second communication session is associated with a second client device;
accessing or generating a group profile that is associated with the second communication session, wherein: the group profile is assigned a first group profile state in a state-machine-based progression of group profile states; and the group profile is associated with a group lead score;
associating the first communication session with the group profile;
adjusting the group lead score based on the one or more interactions between the web server and the first client device;
determining that adjusting the group lead score caused the group lead score to cross a threshold value;
moving the group profile from the first group profile state to a second group profile state in response to the group lead score crossing the threshold value; and
authorizing the first client device and the second client device to access additional data content of the web server in response to moving the group profile to the second group profile state.

16. The system of claim 15, wherein detecting a characteristic associated with the first communication session comprises receiving an Internet Protocol (IP) address.

17. The system of claim 15, wherein detecting the characteristic associated with the first communication session is based on the one or more interactions between the web server and the first client device.

18. The system of claim 15, wherein the characteristic comprises a selection from the group consisting of: a geographic location, a demographic characteristic, and a relationship with an organization.

19. The system of claim 15, wherein the instructions further cause the one or more processors to operate by authorizing additional client devices that are associated with other communication sessions in the group profile to access the second additional data content of the web server in response to moving the group profile to the second group profile state.

20. The system of claim 15, wherein the second communication session comprises a plurality of communication sessions.

* * * * *